March 27, 1945. J. M. O'MALLEY 2,372,289
UNIVERSAL COUPLING
Filed Feb. 6, 1942 2 Sheets-Sheet 1

INVENTOR
JOSEPH M. O'MALLEY
BY
ATTORNEY

March 27, 1945.　　　J. M. O'MALLEY　　　2,372,289
UNIVERSAL COUPLING
Filed Feb. 6, 1942　　　2 Sheets-Sheet 2

INVENTOR
JOSEPH M. O'MALLEY
BY
ATTORNEY

Patented Mar. 27, 1945

2,372,289

UNITED STATES PATENT OFFICE 2,372,289

UNIVERSAL COUPLING

Joseph M. O'Malley, Worcester, Mass., assignor to Morgan Construction Company, Worcester, Mass., a corporation of Massachusetts Application February 6, 1942, Serial No. 429,724

7 Claims. (Cl. 64—8)

This invention relates to universal couplings, and more particularly to spindle couplings of the type used in rolling mills to connect the pinion shafts with the roll necks.

Rolling mill spindle couplings are subjected to heavy torques, they must operate with considerable misalignment, and they are limited in overall diameter to avoid interference with adjacent couplings. Many of these devices as heretofore constructed have been very noisy in operation and subject to severe wear, chiefly because of poor mechanical design and construction, excessive backlash, and lack of proper lubrication. In certain improved designs the backlash has been largely eliminated, but the problem of lubricating the sliding surfaces has not been solved, and it is necessary to disassemble the coupling when changing rolls. In many of these prior couplings a very expensive construction is required for the roll necks.

It is accordingly one object of the invention to provide a universal coupling particularly suitable for driving rolling mills and capable of transmitting heavy torques under conditions of appreciable misalignment.

It is a further object of the invention to provide a universal coupling having relatively movable parts which can be properly lubricated and enclosed, and which can remain enclosed when the coupling is disconnected from the driving or driven elements.

It is a further object of the invention to provide a rolling mill spindle coupling which will operate quietly and under severe operating conditions throughout a long life of service.

It is a further object of the invention to provide a rolling mill spindle coupling which can be utilized with rolls having necks of comparatively simple and inexpensive construction.

It is a further object of the invention to provide a rolling mill spindle coupling so constructed and arranged that the rolls can easily be changed or the spindle removed without disassembling or exposing the enclosed and lubricated parts.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is an elevation of a rolling mill spindle coupling;

Figure 7:
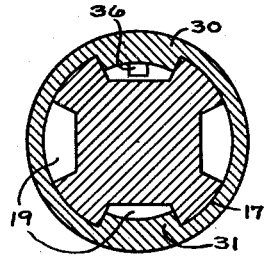
Fig. 7 is a section on the line 7—7 of Fig. 3.
Figure 8:
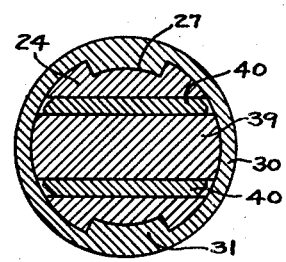
Fig. 8 is a section on the line 8—8 of Fig. 3.

The embodiment illustrated comprises two rotatable elements 15 and 16 projecting toward one another and arranged in approximate alignment, with their adjacent ends spaced apart. The element 15 may be the neck of a rolling mill roll, and the element 16 may be the pinion shaft which serves to drive the roll. The end portion of each of these elements is provided with a cylindrical outer surface 17 which is interrupted by four longitudinally extending grooves 19 (Fig. 7) equally spaced about the circumference. These grooves are deep, and their sides lie in approximately radial planes. The cylindrical surface 17 is also interrupted approximately midway of its length, by a comparatively shallow circumferential groove 20.

Figure 11:
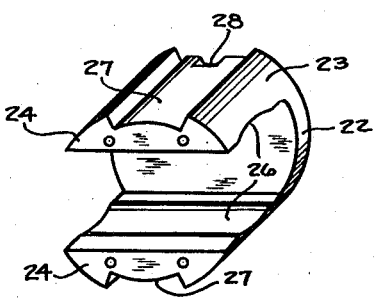
Fig. 11 is a perspective view of a coupling member forming a part of the mechanism.

Adjacent each of the rotatable elements 15 and 16, and in axial alignment therewith, I provide a bifurcated coupling member or element 22 having a cylindrical outer surface 23 (Fig. 11) with substantially the same diameter as the surface 17. These members 22 are slightly spaced from the corresponding elements 15 and 16 in the axial direction. Each member 22 comprises two branch portions 24 having their opposite interior surfaces provided with transverse grooves 26 of concave cylindrical form. The outer cylindrical surface 23 is interrupted by two grooves 27 which extend along the branch portions 24, the sides of these grooves lying in approximately radial planes. At the outer end of each groove 27 there is provided a small recess 28.

Each coupling member 22 is releasably connected to the corresponding element 15 or 16, and for this purpose I provide a sleeve 30 which surrounds the coupling member and the adjacent portion of the element to be connected therewith.

Figure 5:
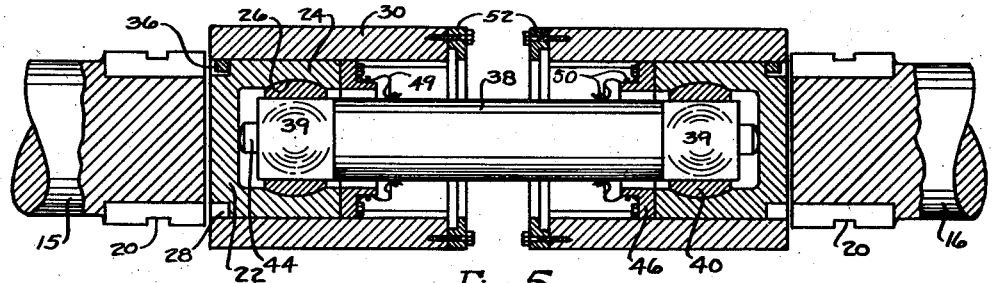
Fig. 5 is a view similar to Fig. 3 but showing the coupling sleeves drawn inwardly to disconnect the coupling.
Figure 6:
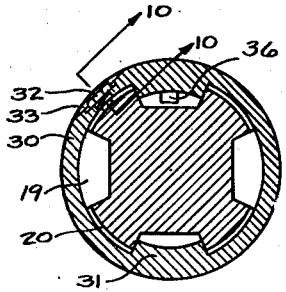
Fig. 6 is a section on the line 6—6 of Fig. 3.
Figure 10:
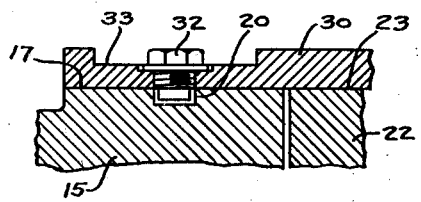
Fig. 10 is an enlarged view in section on the line 10—10 of Fig. 6.

The interior of this sleeve is cylindrical and of the proper diameter to slide freely over the surfaces 17 and 23, this internal cylindrical surface being interrupted however by two diametrically opposed longitudinal ribs 31 shaped to fit within the grooves 27 of the coupling member and within two of the grooves 19 of the connected element. With this construction the sleeve will serve to transmit torque between the connected parts. In order to hold the sleeve in place during periods of operation, a screw 32 (Figs. 6 and 10) extends radially therethrough into the groove 20, the head of the screw being located in a recess 33 in the sleeve so that it will not project above the cylindrical outer surface of the sleeve. At the outer end of one rib 31 there is provided a small lug 36 which may be welded or otherwise secured to the rib. These parts are so arranged that the operator can withdraw the screw 32 and then slide the sleeve inwardly, as shown in Fig. 5, until the lug 36 enters the recess 28 and prevents further movement. This will disconnect the coupling.

Figure 12:
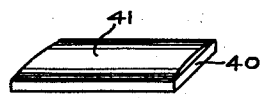
Fig. 12 is a perspective view of a slipper forming a part of the mechanism.

The two coupling members 22 are connected to one another by a spindle 38 having at its opposite ends two transversely extending heads 39 which are preferably integral with the spindle. These heads 39 are positioned within the coupling members and the sleeves 30. The opposite sides of each head 39 are formed by plane parallel surfaces which are engaged by slippers 40 positioned within the grooves 26 of the coupling member 22. Each slipper has a convex cylindrical surface 41 (Fig. 12) of the same radius as the grooves 26. The ends of each head 39 are provided with convex spherical surfaces with a radius substantially equal to that of the interior of the sleeve 30. Thus the heads will be properly centered within the sleeves while remaining free to move universally with respect thereto. A small rounded lug 44 is provided at each end of the spindle 38 to hold the heads 39 out of contact with the coupling members 22. It will be apparent that with this construction the spindle 38 is universally connected to both coupling members, since the heads 39 can swing in one plane between the slippers 40, while the slippers can turn in the grooves 26 and thus allow the spindle to swing in a plane at right angles to the first plane.

Figure 4:
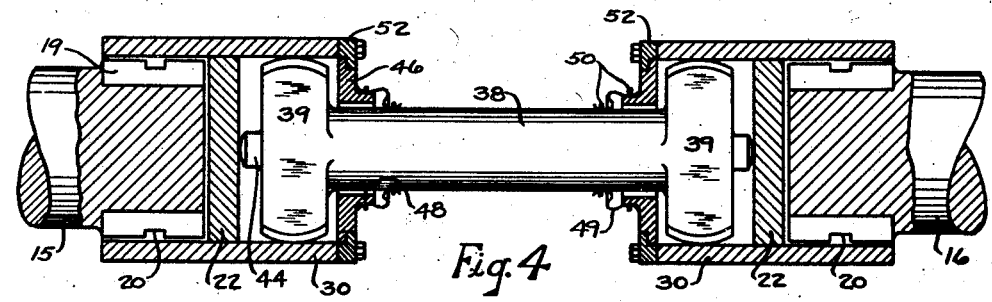
Fig. 4 is a section on the line 4—4 of Fig. 3.
Figure 9:
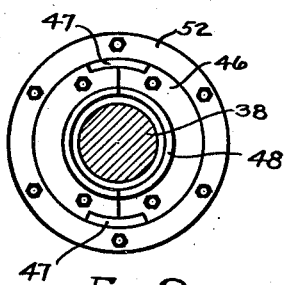
Fig. 9 is a section on the line 9—9 of Fig. 3.

These various sliding surfaces will need lubrication to reduce friction and wear, and for this purpose the interior of the coupling members may be filled with grease. In order to retain this grease and prevent contamination thereof, a ring 46 is fastened to the free ends of the branch portions 24, in surrounding relation to the spindle, the outside diameter of the ring being substantially equal to the inside diameter of the sleeve 30. For the purpose of assembly, each ring is divided along a diameter into two parts, as shown in Fig. 9. Each ring 46 is provided with two diametrically opposite notches 47 in its periphery, of the proper size and shape to receive the ribs 31 when the sleeve 30 is retracted. Each ring 46 is also formed with an annular flange 48 which is connected to the spindle 38 by means of an annular boot 49 of a suitable flexible material, such as a grease-tight fabric, held in place by wires 50. In order to provide an even more effective enclosure, a ring 52 is mounted on the inner end of the sleeve 30 in surrounding relation to the ring 46, the adjacent edges of these rings being shaped to provide a ship-lap joint, as best shown in Fig. 4. By engaging the inner ring 46, the outer ring 52 will limit the outward sliding movement of the sleeve 30.

It will now be apparent that the invention will serve to transmit power from the pinion shaft 16 to the roll neck 15 smoothly and uniformly even though these parts may be considerably out of alignment. Under such operating conditions there will be a continuous oscillating movement of the spindle heads 39 between the slippers 40, and a continuous oscillating movement of the slippers 40 in the grooves 26. These movements involve a sliding action between surfaces which are well lubricated and of ample area to avoid excessive concentrations of pressure thereon. These surfaces are entirely enclosed to retain the grease and prevent access of foreign matter. The sleeves 30 transmit the torque and also serve to prevent any spreading or separation of the branches 24 by reason of the pressure of the slippers 40 thereon. Consequently these branches are not subjected to appreciable bending moments, and the coupling members 22 can be of comparatively small diameter. The sleeves 30 also hold the coupling members in correct alignment with the corresponding elements 15 and 16, and since the sleeves do not move relative to these parts during the operation of the mechanism the wear thereon will be negligible.

Figure 1:
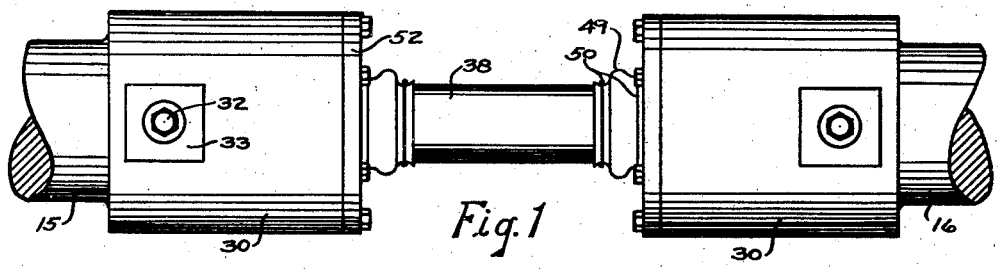
Figure 2:
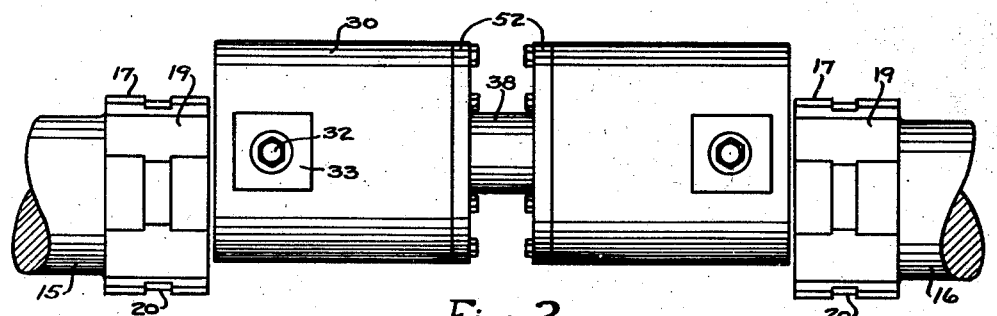
Fig. 2 is an elevation showing the coupling disconnected from the driving and driven elements and partially withdrawn therefrom.
Figure 3:
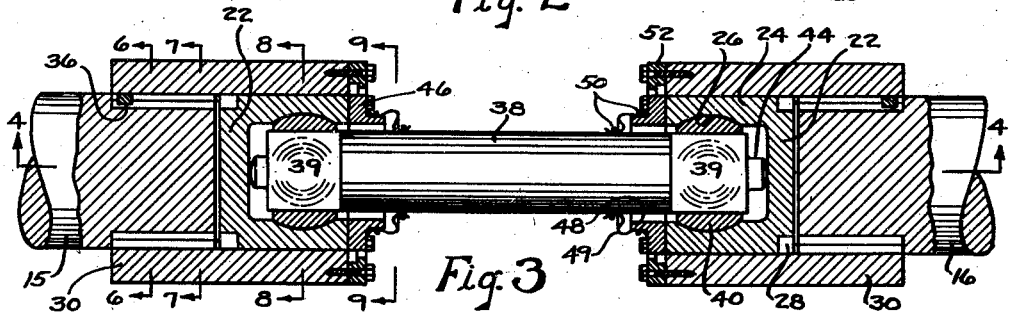
Fig. 3 is a longitudinal section through the coupling and associated parts.

If a roll stand is to be taken out of service or "dummied," the coupling spindle can easily be removed. It is merely necessary to loosen the screws 32 sufficiently to free them from the grooves 20 and then slide the sleeves 30 inwardly until the lugs 36 enter the recesses 28, as shown in Fig. 5. The sleeves will now be clear of the roll neck and pinion shaft, so that the spindle 38, sleeves and coupling members may all be lifted directly upward without interference, as indicated in Fig. 2. Even with the sleeves thus retracted, they still enclose the coupling members and all the lubricated sliding surfaces of the mechanism, besides preventing any loss of grease. The invention also facilitates the changing of rolls in a roll housing of the open-top type, since it is merely necessary to retract the sleeve 30 from the roll neck, whereupon the roll can be raised without interference with any of the parts of the coupling. It will be noted that the pinion shafts and roll necks are of a comparatively simple shape which can be manufactured at relatively low cost.

Having thus described my invention, what I claim as new and desire to secure by Letters Patent is:

1. In combination with a rotatable element having a projecting end portion of non-circular external shape, a hollow coupling element positioned adjacent the said end portion in axial alignment therewith and slightly spaced therefrom in the axial direction, the coupling element being of non-circular external shape, a sleeve surrounding the said end portion and the coupling element, the sleeve having a non-circular internal surface shaped to engage the external surfaces of the said elements so that the sleeve may transmit torque from one element to the other, a rotatable spindle having one end positioned within the coupling element and the sleeve, and means universally connecting the said end of the spindle to the coupling element, the sleeve being slidable axially along said elements to a position such as to disconnect the elements and allow relative lateral movement thereof.

2. In combination with a rotatable element having a projecting end portion with a cylindrical outer surface interrupted by longitudinally extending grooves, a hollow coupling element positioned adjacent the said end portion in axial alignment therewith and slightly spaced therefrom in the axial direction, the coupling element having a cylindrical outer surface interrupted by longitudinally extending grooves, a sleeve surrounding the said end portion and the coupling element, the sleeve having a cylindrical internal surface interrupted by longitudinally extending ribs which project into the grooves in the said elements, whereby the sleeve may transmit torque from one element to the other, a rotatable spindle having one end positioned within the coupling element and the sleeve, and means universally connecting the said end of the spindle to the coupling element, the sleeve being slidable axially along said elements to a position such as to disconnect the elements and allow relative lateral movement thereof.

3. In combination with a rotatable element having a projecting end portion of non-circular external shape, a bifurcated coupling element of non-circular external shape positioned adjacent the said end portion in axial alignment therewith and slightly spaced therefrom in the axial direction, the coupling element having two branch portions with opposed interior surfaces provided with transverse grooves of concave cylindrical form, a slipper in each groove, a rotatable spindle having a head on one end located between the slippers, whereby the spindle is universally connected to the coupling element, and a sleeve surrounding the said end portion and the coupling element, the sleeve having a non-circular internal surface shaped to engage the external surfaces of the said elements so that the sleeve may transmit torque from one element to the other, the sleeve being slidable axially along said elements to free it entirely from the rotatable element and allow relative lateral movement of the elements.

4. In combination with a rotatable element having a projecting end portion with a cylindrical outer surface interrupted by two diametrically opposed longitudinally extending grooves, a bifurcated coupling element positioned adjacent the said end portion in axial alignment therewith and slightly spaced therefrom in the axial direction, the coupling element having two diametrically opposed longitudinally extending branch portions, the coupling element having a cylindrical outer surface interrupted by two longitudinally extending grooves adjacent the respective branch portions, a sleeve surrounding the said end portion and the coupling element, the sleeve having a cylindrical internal surface interrupted by two longitudinally extending ribs which project into the grooves in the said elements, whereby the sleeve may transmit torque from one element to the other, the two branch portions having opposed interior surfaces provided with transverse grooves of concave cylindrical form, a slipper in each transverse groove, and a rotatable spindle having a head on one end located between the slippers, whereby the spindle is universally connected to the coupling element, the sleeve being slidable axially along said elements to free it entirely from the rotatable element and allow relative lateral movement of the elements.

5. In combination with a rotatable element having a projecting end portion of non-circular external shape, a bifurcated coupling element of non-circular external shape positioned adjacent the said end portion and axially aligned therewith, the coupling element having two branch portions with opposed interior surfaces provided with transverse grooves of concave cylindrical form, a slipper in each groove, a rotatable spindle having a head on one end located between the slippers, whereby the spindle is universally connected to the coupling element, a ring secured to the branch portions and surrounding the spindle, a flexible annular boot connecting the ring with the spindle, and a sleeve surrounding the said end portion and the coupling element, the sleeve having a non-circular internal surface shaped to engage the external surfaces of the said elements so that the sleeve may transmit torque from one element to the other, the sleeve being slidable axially along said elements to free it entirely from the rotatable element and allow relative lateral movement of the elements.

6. In combination with a rotatable element having a projecting end portion with a cylindrical outer surface interrupted by two diametrically opposed longitudinally extending grooves, a bifurcated coupling element positioned adjacent the said end portion and axially aligned therewith, the coupling element having two diametrically opposed longitudinally extending branch portions, the coupling element having a cylindrical outer surface interrupted by two longitudinally extending grooves adjacent the respective branch portions, a sleeve surrounding the said end portion and the coupling element, the sleeve having a cylindrical internal surface interrupted by two longitudinally extending ribs which project into the grooves in the said elements, whereby the sleeve may transmit torque from one element to the other, the two branch portions having opposed interior surfaces provided with transverse grooves of concave cylindrical form, a slipper in each transverse groove, a rotatable spindle having a head on one end located between the slippers, whereby the spindle is universally connected to the coupling element, the sleeve being slidable axially along said elements to free it entirely from the rotatable element and allow relative lateral movement of the elements, a ring secured to the branch portions and surrounding the spindle, the outside diameter of the ring being substantially equal to the inside diameter of the sleeve, the ring having two diametrically opposed notches in its periphery to receive the ribs on the sleeve when the latter is retracted, and a flexible annular boot connecting the ring with the spindle.

7. In combination with a rotatable element having a projecting end portion with a cylindrical outer surface interrupted by two diametrically opposed longitudinally extending grooves, a bifurcated coupling element positioned adjacent the said end portion and axially aligned therewith, the coupling element having two diametrically opposed longitudinally extending branch portions, the coupling element having a cylindrical outer surface interrupted by two longitudinally extending grooves adjacent the respective branch portions, a sleeve surrounding the said end portion and the coupling element, the sleeve having a cylindrical internal surface interrupted by two longitudinally extending ribs which project into the grooves in the said elements, whereby the sleeve may transmit torque from one element to the other, the two branch portions having opposed interior surfaces provided with transverse grooves of concave cylindrical form, a slipper in each transverse groove, a rotatable spindle having a head on one end located between the slippers, whereby the spindle is universally connected to the coupling element, the sleeve being slidable axially along said elements to free it entirely from the rotatable element and allow relative lateral movement of the elements, a ring secured to the branch portions and surrounding the spindle, the outside diameter of the ring being substantially equal to the inside diameter of the sleeve, the ring having two diametrically opposed notches in its periphery to receive the ribs on the sleeve when the latter is retracted, an outer ring mounted on the inner end of the sleeve in surrounding relation to the first-mentioned ring, the adjacent edges of the rings being shaped to provide a ship-lap joint, and a flexible annular boot connecting the inner ring with the spindle.

JOSEPH M. O'MALLEY.